(12) United States Patent
Nippert

(10) Patent No.: US 6,355,901 B1
(45) Date of Patent: Mar. 12, 2002

(54) WELDING ELECTRODE CONNECTING ADAPTER

(75) Inventor: Russell Alan Nippert, Columbus, OH (US)

(73) Assignee: The Nippert Company, Delaware, OH (US)

( * ) Notice: Subject to any disclaimer, the term of this patent is extended or adjusted under 35 U.S.C. 154(b) by 0 days.

(21) Appl. No.: 09/432,031

(22) Filed: Nov. 2, 1999

(51) Int. Cl.[7] .................................................. B23K 11/30
(52) U.S. Cl. .................. 219/119; 219/120; 285/148.23; 285/332; 285/332.1; 285/901; 403/334; 403/333
(58) Field of Search ................................ 219/119, 220; 285/148.23, 332, 332.1, 901; 403/334, 333

(56) References Cited

U.S. PATENT DOCUMENTS

| | | | |
|---|---|---|---|
| 2,051,284 A | * | 8/1936 | Ball |
| 2,138,388 A | * | 11/1938 | Platz |
| 2,761,953 A | * | 9/1956 | Kerr |
| 3,226,138 A | * | 12/1965 | Ellis |
| 3,320,401 A | | 5/1967 | Zachry et al. |
| 3,342,972 A | | 9/1967 | Penberg |
| 3,657,509 A | | 4/1972 | Beneteau |
| 3,909,581 A | * | 9/1975 | Stone et al. |
| 3,915,481 A | * | 10/1975 | Marsh, Jr. |
| 4,156,123 A | * | 5/1979 | Fischer et al. |
| 4,288,024 A | * | 9/1981 | Nippert |
| 4,345,136 A | * | 8/1982 | Nippert |
| 4,582,979 A | | 4/1986 | Moerke |
| 4,588,870 A | | 5/1986 | Nadkarni et al. |
| 4,728,765 A | * | 3/1988 | Prucher |
| 4,756,465 A | * | 7/1988 | Pranch et al. |
| 5,015,816 A | | 5/1991 | Bush et al. |
| 5,126,528 A | | 6/1992 | Bush et al. |
| 5,260,546 A | | 11/1993 | Ingwersen et al. |
| 5,349,153 A | | 9/1994 | Prucher |
| 5,387,774 A | * | 2/1995 | Boyer et al. |
| 5,511,829 A | * | 4/1996 | Sicotte et al. |
| 5,841,105 A | | 11/1998 | Haczynski et al. |
| 5,950,252 A | * | 9/1999 | Fettes |

FOREIGN PATENT DOCUMENTS

| | | | |
|---|---|---|---|
| JP | 405096379 A | * | 4/1993 |
| JP | 11-294592 | * | 10/1999 |

* cited by examiner

Primary Examiner—Blaine Copenheaver
Assistant Examiner—Hai Vo
(74) Attorney, Agent, or Firm—Killworth, Gottman, Hagan & Schaeff, LLP

(57) ABSTRACT

A connecting adapter configured to mate on opposite ends with a standard adapter shank and a standard welding electrode of the resistance type. The connecting adapter is a hollow body with male and female connecting portions. The male portion, integral with the female portion, is sized to accommodate the standard welding electrode thereon. The female portion is sized to accommodate a taper portion of the shank within the hollow body and has exterior cross-sectional dimensions similar to those of the shank. The connecting adapter being formed of a wear-resistant conductive martial is replaced only periodically, thus reducing greatly the wear on the more expensive standard adapter shank.

15 Claims, 2 Drawing Sheets

WELDING ELECTRODE CONNECTING ADAPTER

BACKGROUND OF THE INVENTION

The present invention relates to a connecting adapter and particularly, to a connecting adapter for a resistance welding electrode configured to mate on opposite ends with a standard adapter shank and a standard welding electrode.

Resistance welding is used widely to join metal pieces together by electrically inducing localized fusion of the metal. Generally, a pair of metal sheets is overlapped, and then opposed electrodes are brought in from either side to exert substantial pressure on the overlapping joint. A very high current is then passed between the electrodes. Due to current flow resistance at the joint, substantial heat is generated at the spot pressed between electrodes, which fuses together the metal sheets.

A resistance welding system comprises a high voltage power supply, a source of fluid cooling unit, and a robotic arm to which a welding shank attaches. A welding electrode having a central internal cavity is mounted on the welding shank by pressing the electrode over a tapered portion at an end of the shank. A resistance-welding electrode is typically made from copper, is generally elongated in shape, and typically has a tapered exterior tip. The standard resistance welding shank is generally an elongated hollow body with a defined central cavity, and is typically made of zirconium copper, chrome copper or dispersion strengthened copper. Cooling fluid is supplied to the central cavity of the resistance-welding electrode through the central cavity of the standard shank during the welding operation to limit heating of the electrode and softening and deformation of the electrode that would otherwise result.

The tip of the welding electrode, which contacts the metal workpiece, wears by spreading or "mushrooming" deformation. Overtime, the electrode will wear sufficiently that it must be replaced. Repeatedly replacing electrodes will, in turn, cause the taper portion of the adapter shank to wear to the point where the adapter shank must also be replaced. The adapter shank normally outlasts electrodes by a ratio of 10:1. However, since the cost of a standard adapter shank can be significant, depending upon the material and length of the shank, minimizing shank wear and replacement are highly desirable.

Therefore, there is a need for a device, which is mountable between the standard resistance adapter shank and the standard resistance welding electrode, to protect the standard resistance welding adapter shank from the wear that would otherwise result from repeated electrode replacement.

SUMMARY OF THE INVENTION

The present invention provides a connecting adapter that reduces the wear to which a standard resistance welding adapter shank would otherwise be subjected. The connecting adapter is used with a resistance welding electrode having an attachment end portion and a resistance welding shank having a mounting end portion. The connecting adapter is comprised an elongated body wall of electrically conductive metal having a proximal end portion and an integral distal end portion. The proximal end portion of the body has a shank attachment structure that is adapted to be mounted in an electrical conducting and mechanically supported relation to the mounting end portion of the shank. The distal end portion of the body has an electrode attachment structure that is adapted to be attached in an electrically conducting and mechanically supported relation to the attachment end portion of the electrode.

In a first portion of the connecting adapter of the present invention, the outer surface of the body wall is shaped to match an exterior surface of a standard welding adapter shank. A through-bore defined by the inner surfaces, in the first portion of the connecting adapter is sized to accommodate there within the end of the welding shank designed to receive the welding electrode. In a second portion of the connecting adapter, the outer surface is tapered down in diameter from the first portion in order to allow the electrode to mount thereon. The through-bore in the second portion of the connecting adapter, as defined by the inner surfaces, is sized to match the interior diameter of a standard welding shank.

The connecting adapter having two differently shaped portions allows the mounting of a standard adapter shank at one end of the connecting adapter and a standard welding electrode at another opposed end of the connecting adapter. It is to be appreciated that because the connecting adapter is mounted between the adapter shank and the welding electrode, the connecting adapter protects the welding shank from wear. Additionally, since the connecting adapter is formed of a wear-resistant material, it is replaced only periodically, further reducing the wear on the more expensive standard adapter shank.

The connecting adapter is formed on a high-speed, five-die, cold former. Such a manufacturing process allows the production of an economical strength hardened adapter. It is to be appreciated that the connecting adapter is made of zirconium copper or dispersion strengthened copper or any other suitable material that provides high electrical conductivity, anneal resistance, and resistance to wear and deformation.

It is an object of the present invention to provide a device that is configured to mate on opposite ends with a standard resistance welding adapter shank and a standard resistance welding electrode, to protect the welding adapter shank from wear. It is another object of the present invention to provide a connecting adapter that fits over an end portion of a standard resistance welding shank and fits into a cavity portion of a standard welding electrode.

Further objects and advantages of the invention can be ascertained by reference to the specification and drawings herein which are by way of example only and not in limitation of the invention which is defined by the claims and equivalents thereto.

DETAILED DESCRIPTION OF THE PREFERRED EMBODIMENTS

Figure 1:
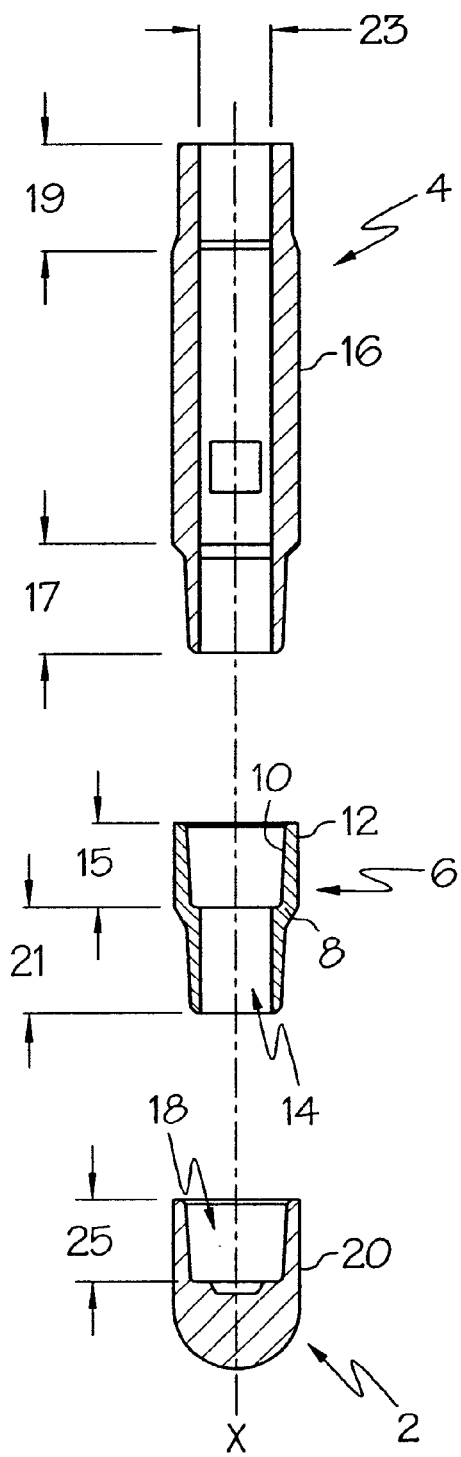
FIG. 1 illustrates an exploded cross-sectional view of a preferred embodiment of the present invention.

FIG. 1 illustrates an exploded cross-sectional view of a standard resistance-welding electrode 2, a standard resistance-welding shank 4, and the adapter 6 of the present invention. Adapter 6 is designed to be fitted between electrode 2 and shank 4. Adapter 6 comprises an elongated hollow body 8 having interior surfaces 10 and exterior surfaces 12. Interior surfaces 10 define a through-bore 14 that extends the entire longitudinal length of adapter 6 along centerline axis x.

Figure 2A:
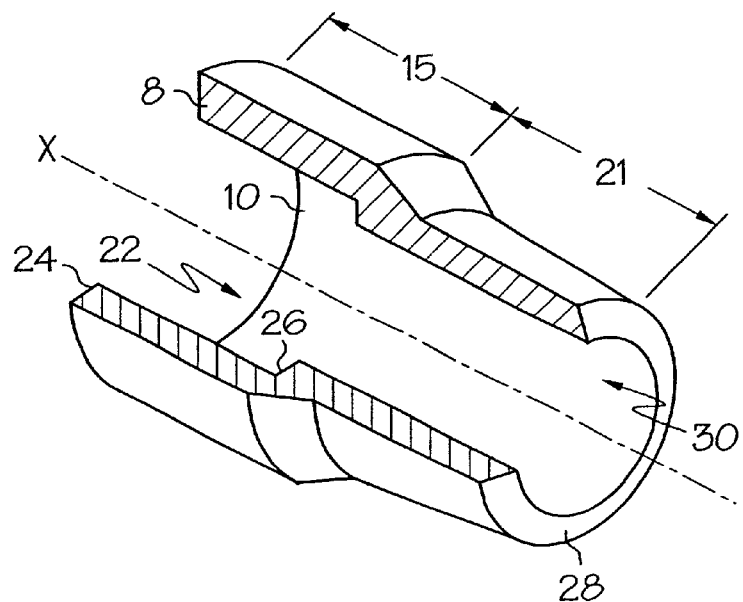
FIG. 2a is a perspective cutaway view of a preferred connecting adapter body; and, FIG. 2b is a perspective cutaway view of an alternative connecting adapter body.
Figure 2B:
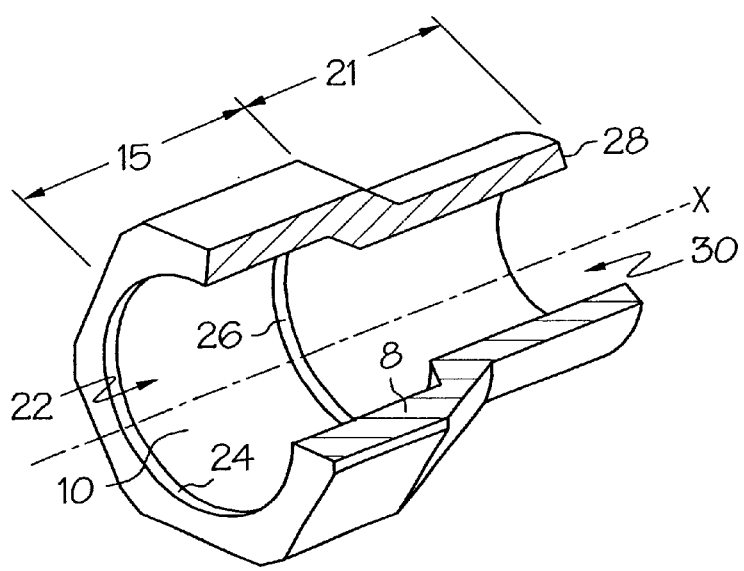

In a female axial portion 15 of adapter 6, exterior surfaces 12 of body 8 are shaped similar to outer surfaces 16 of welding shank 4. The phrase "outer surfaces" refers to the largest diametric exterior-surfaces of shank 4 and not to those surfaces defining tapered-end portions 17, 19 of shank 4. As illustrated by FIGS. 2a and 2b, preferably female axial portion 15 of adapter 6 is either cylindrical or hexagonal to match the standard shapes of a majority of resistance welding shank adapters known to persons in the art.

Through-bore 14 in female axial portion 15 of adapter 6, as defined by interior surfaces 10, is sized to accommodate there within tapered-end portion 17 of welding shank 4. As known in the art, tapered-end portion 17 of welding shank 4 is designed to be fitted-over with an attachment end portion 25 of the welding electrode 2. Accordingly, the inner dimensions of adapter 6 in female axial portion 15 are similar to the dimensions of a cavity 18 defined by a body 20 of a standard resistance welding electrode 2. Using the above-mentioned dimension ensures a proper fit of adapter 6 on welding shank 4. Additionally, to provide for a uniformed appearance and cooling throughout the shank, adapter, and electrode, cross-sectional dimensions for exterior surfaces 12 along female axial portion 15 are similar to those of shank 4.

In a male axial portion 21 of adapter 6 outer surfaces 12 are tapered and sized similarly to tapered-end portion 17 of shank 4 in order to mount electrode 2 properly thereon. The diameter of through-bore 14 in male axial portion 21 of the adapter 6 is sized to match interior diameter 23 of standard welding shank 4. Such interior sizing ensures cooling is provided evenly throughout shank 4, adapter 6, and electrode 2 when in use.

Adapter 6 by having male/female axial portions allows the mounting of welding electrode 2 over male axial portion 21, and the accommodation of tapered-end portion 17 of shank 4 within female axial portion 15. Both electrode 2 and shank 4 remain rigidly mounted to adapter 6 by an interference-fit.

Turning now to FIGS. 2a–2b shown is female axial portion 15 of adapter 6 having the exterior shape of a cylinder and a hexagon, respectively. Female axial portion 15 at a proximal end has a shank opening 22 formed therein. Interior surfaces 10 spanning axially therein define shank opening 22. As stated above, interior surfaces 10 in female axial portion 15 engage the tapered-end portion 17 of shank 4 of a predetermined size. Persons skilled in the art know the predetermined sizes of shank 4. Thus, depending on the size of shank opening 22 required to fit a shank of a predetermined size the diameter of the female axial portion 15 of adapter 6 may vary from shank to shank.

Adjacent the shank opening 22 is an inwardly facing annular taper 24. Inwardly facing annular taper 24 serves to facilitate pressing the adapter 6 into the welding shank 4. At a transition area of interior surface 10 between female axial portion 15 and integral male axial portion 21, lays an annular tapered-shoulder 26. Annular tapered-shoulder 26 serves to seat and limit the insertion of shank 4 into adapter 6.

The male axial portion 21 of adapter 6, integral with female axial portion 15 has an end distal from the female axial portion 15 of the adapter 6. Adjacent the distal end and formed in the body 8 is an annular taper 28. Annular taper 28 serves to facilitate pressing the adapter 6 into the cavity 18 of electrode 2.

At the distal end, annular tapered-wall 24 defines an end opening 30. End opening 30 in the male axial portion 21 communicates with shank opening 22 in the female axial portion 15 to form through-bore 14 (FIG. 1) in adapter 6. Because the female axial portion 15 is sized to fit tapered-end portion 17 of shank 4, the diameter of the female axial portion 15 is greater than the diameter of the male axial portion 21. Male axial portion 21 has a diameter sized to fit electrode 2 thereon. It is to be appreciated that since connecting adapter 6 is electrically conductive and mechanically supported between welding shank 4 and welding electrode 2, connecting welding adapter 6 protects the shank 4 from wear when used.

In order to resist wear, connecting adapter 6 is made of an appropriate electrically conductive material, such as zirconium copper or dispersion strengthened copper. In the present invention, preferably connecting adapter 6 is formed on a high-speed, five-die, cold former. Using a cold former actually improves the strength of the adapter 6 through cold work hardening and improved grain flow. Other benefits of cold forming include: reduced raw material waste, low scrap rates, tight tolerances, good surface finishes, consistent dimensions, high speed production rates, and improved physical properties, resulting in high quality parts at low production costs. However, if desired, other known manufacturing processes may be used to produce adapter 6.

It is intended that the foregoing detailed description be regarded as illustrative rather limiting, and that it be understood that the following claims, including all equivalents, are intended to define the scope of this invention.

What is claimed is:

1. A connecting adapter for use with a resistance welding electrode cap having an attachment end portion designed to mount over a mounting end portion of a resistance welding shank, said connecting adapter comprising:

an elongated body wall of electrically conductive metal having a proximal end portion and an integral distal end portion, the proximal end portion of the elongated body wall having a shank attachment structure adapted to mount over, in electrical conducting and mechanically supported relation, the mounting end portion of the shank, and the distal end portion of the body wall having an electrode attachment structure adapted to be fitted-over with and attached to the attachment end portion of the electrode cap by an interference fit.

2. The adapter of claim 1 wherein the proximal end portion is a female axial portion adapted to receive a male mounting portion of the welding shank, and the distal end portion is a male axial portion adapted to accommodate a female attachment portion of the welding electrode cap.

3. The adapter of claim 2 wherein the female axial portion has a shank opening and the male axial portion has an end opening, said openings communicate defining a through-bore in said elongated body wall.

4. The adapter of claim 3 wherein an exterior surface of the female axial portion is shaped similar to an exterior surface of said shank.

5. The adapter of claim 4 where the shaped exterior surface of the female axial portion is selected from the group consisting of cylindrical and hexagonal.

6. The adapter of claim 4 wherein an interior diameter of said male axial portion is equal to an interior diameter of said shank.

7. The adapter of claim 1 wherein the electrically conductive metal is selected from the group consisting of zirconium copper and dispersion strengthened copper.

8. A resistance welding male/female adapter for use with a resistance welding shank having a tapered end portion designed to be fitted-over with an attachment end portion of a resistance welding electrode cap, said adapter comprising:

a longitudinally extending hollow body of electrically conductive metal having a female axial portion and an integral male axial portion, the female axial portion having an interior structure sized to accommodate within the tapered end portion of said shank in an electrical conducting and mechanically supported relation, and the male axial portion of the hollow body having an exterior structure sized to be fitted-over with and attached to the attachment end portion of said electrode cap by an interference fit.

9. The adapter of claim 8 wherein said female axial portion supports said tapered end portion of said shank by an interference fit.

10. The adapter of claim 8 wherein the female axial portion has a shank opening and the male axial portion has an end opening, said openings communicate defining a through-bore in said hollow body.

11. The adapter of claim 8 wherein an exterior surface of the female axial portion is shaped similar to an exterior surface of said shank.

12. The adapter of claim 11 where the shaped exterior surface of the female axial portion is of a shape selected from the group consisting of cylindrical and hexagonal.

13. The adapter of claim 8 wherein an interior diameter of said male axial portion is equal to an interior diameter of said shank.

14. The adapter of claim 8 wherein the electrically conductive metal is selected from the group consisting of zirconium copper and dispersion strengthened copper.

15. A resistance welding electrode assembly comprising:

a resistance welding shank having a mounting end portion;

a resistance welding electrode cap having an attachment end portion; and a connecting adapter having an elongated body wall of electrically conductive metal with a proximal end portion and an integral distal end portion, the proximal end portion of the elongated body wall having a shank attachment structure mounted over, in electrical conducting and mechanically supported relation, the mounting end portion of the shank, and the distal end portion of the elongated body wall having an electrode attachment structure fitted-over with and attached to, in electrically conducting and mechanically supported relation, the attachment end portion of the electrode cap by an interference fit.

* * * * *